US 6,647,399 B2

(12) United States Patent
Zaremba

(10) Patent No.: US 6,647,399 B2
(45) Date of Patent: Nov. 11, 2003

(54) METHOD, SYSTEM, PROGRAM, AND DATA STRUCTURES FOR NAMING FULL BACKUP VERSIONS OF FILES AND RELATED DELTAS OF THE FULL BACKUP VERSIONS

(75) Inventor: Christopher Zaremba, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/450,174

(22) Filed: Nov. 29, 1999

(65) Prior Publication Data

US 2003/0158831 A1 Aug. 21, 2003

(51) Int. Cl.⁷ .............................................. G06F 17/30
(52) U.S. Cl. ........................ 707/204; 707/203; 707/10; 714/20
(58) Field of Search ............................. 707/1–206, 500, 707/511; 709/248; 714/12, 19, 20

(56) References Cited

U.S. PATENT DOCUMENTS

| | | | | |
|---|---|---|---|---|
| 5,347,653 A | * | 9/1994 | Flynn et al. | 707/203 |
| 5,574,906 A | | 11/1996 | Morris | 395/601 |
| 5,673,382 A | * | 9/1997 | Cannon et al. | 707/202 |
| 5,689,699 A | | 11/1997 | Howell et al. | 395/609 |
| 5,761,677 A | * | 6/1998 | Senator et al. | 707/200 |
| 5,778,395 A | * | 7/1998 | Whiting et al. | 707/204 |
| 5,794,253 A | | 8/1998 | Norin et al. | 707/203 |
| 5,924,094 A | * | 7/1999 | Sutter | 707/1 |
| 5,924,102 A | * | 7/1999 | Perks | 707/200 |
| 6,026,414 A | * | 2/2000 | Anglin | 707/10 |
| 6,065,116 A | * | 5/2000 | Isaacson et al. | 713/1 |
| 6,073,128 A | * | 6/2000 | Pongracz et al. | 707/10 |
| 6,088,694 A | * | 7/2000 | Burns et al. | 707/10 |
| 6,148,412 A | * | 11/2000 | Cannon et al. | 714/6 |
| 6,317,815 B1 | * | 11/2001 | Mayer et al. | 711/162 |
| 6,327,584 B1 | * | 12/2001 | Xian et al. | 707/1 |

OTHER PUBLICATIONS

"ASDM Concepts", IBM International Technical Support Organization, San Jose Center, SG24–4877–00, Feb. 1997, pp. 1–18, 31–78, 155–228.

* cited by examiner

Primary Examiner—Jean R. Homere
Assistant Examiner—Leslie Wong
(74) Attorney, Agent, or Firm—David W. Victor; Konrad Raynes Victor & Mann LLP

(57) ABSTRACT

A system, method, program, and data structure for performing a backup operation of a target file. At least one operation is initiated to perform at least one delta backup of the target file to at least one delta backup set. A delta backup set includes changes made to a version of a full backup set of the target file generated at a first time, such as an incremental or differential backup operation. The at least one delta backup set is assigned a name component indicating the version of the full backup set generated at the first time subject to the delta backup and an operation is initiated to perform a full backup of the target file to a version of the full backup set at a second time. The second time follows the first time. A determination is made of all delta backup sets having the name component indicating the version of the full backup set generated at the first time during the full backup operation at the second time. An operation is initiated to render inactive the determined delta backup sets having the name component indicating the version of the full backup generated at the first time.

25 Claims, 3 Drawing Sheets

METHOD, SYSTEM, PROGRAM, AND DATA STRUCTURES FOR NAMING FULL BACKUP VERSIONS OF FILES AND RELATED DELTAS OF THE FULL BACKUP VERSIONS

BACKGROUND OF THE INVENTION

1. Field of the Invention

The present invention relates to a method, system, program, and data structures for backing up files and, in particular, removing obsolete versions of backup sets as a result of the backup operation.

2. Description of the Related Art

In a client/server environment, the client may back-up data at a central server. In prior art systems, a full back-up of data may be performed from the client to the server and subsequent incremental backups are then performed. In the IBM and Tivoli Storage Management products, such as the Adstar Distributed Storage Manager (ADSM), backup-archive clients can back up and restore files and directories at a server. The backup-archive client can copy files, subdirectories, and directories to media controlled by the server. Backups can be controlled by administrator-defined policies and schedules, or users can request backups of their own data. The backup policy in the backup copy group indicates how many backup versions the server keeps of files and directories, and how long the server keeps backup versions of files and directories before expiring the previous versions of the backup sets. The most recent backup version of a file, referred to as the active version, is not eligible for expiration; only inactive backup versions can be expired.

Prior art versions of ADSM include a backup/archive client for backing up files and a client for backing-up database objects. Back-ups at the file level involve inserting a new version of the entire file including changes since the prior backup. However, database application clients that interface with database products may use ADSM commands to perform incremental backups of the database object that include only the changed data since the last full backup, not the entire database object. This allows the database application client to only send that part of the database object that has changed in the incremental backup to the backup server instead of having to send the entire database object, which can be substantially large. The schedule of performing incremental backups is defined in the backup copy group of the management class for the files. ADSM also provides a differential or cumulative incremental backup that has all changes since the full backup. Thus, there is only one differential backup needed to provide updates since the full backup. Differential and incremental backup sets including changes since a full backup are referred to herein as "delta" backup sets. Additional details of the use of ADSM to backup files is described in the IBM publication "Using ADSM to Back Up Databases," IBM publication no. SG24-4335-03 (IBM Copyright, July, 1998), which publication is incorporated herein by reference in its entirety.

In the prior art, a new version of the full backup plus a related delta(s) including changes since the related full backup are provided unique names with respect to previous versions of the backup and related delta sets. Backups that comprise a full backup set with no delta backup set(s) are provided the same name among versions. Older obsolete versions are maintained on the backup server. When a newer backup version of an object has the same name as the previous version, such as the case with a full backup without delta backup set(s), then the older version is automatically inactivated when the newer version is added to the backup server. On the other hand, in the prior art, full backup sets that have related delta backup sets are uniquely named and are not automatically inactivated when a newer version is generated. Thus, obsolete versions of full backups and related delta backups are not rendered inactive when a new full backup set is added to the server that renders the previous full and related delta backups obsolete. In the prior art, to remove obsolete versions of full and delta backup sets of database objects, a user at the database client would use ADSM commands to generate a report to review the current backup sets of database objects in the server and to inactivate some or all of the obsolete database backup sets. The server periodically runs an expiration routine to determine which inactive backups to delete. The backup files the user manually inactivated are deleted by the server when it checks for old inactive jobs to expire according to a predetermined date or version number expiration requirement set in the management policy.

There is a need in the art for an improved method, system, and program for removing obsolete backup sets.

SUMMARY OF THE PREFERRED EMBODIMENTS

To overcome the limitations in the prior art described above, preferred embodiments disclose a system, method, program, and data structure for performing a backup operation of a target file. At least one operation is initiated to perform at least one delta backup of the target file to at least one delta backup set. A delta backup set includes changes made to a version of a full backup set of the target file generated at a first time. The at least one delta backup set is assigned a name component indicating the version of the full backup set generated at the first time subject to the delta backup and an operation is initiated to perform a full backup of the target file to a version of the full backup set at a second time. The second time follows the first time. A determination is made of all delta backup sets having the name component indicating the version of the full backup set generated at the first time during the full backup operation at the second time. An operation is initiated to render inactive the determined delta backup sets having the name component indicating the version of the full backup generated at the first time.

In further embodiments, the version of the full backup set of the target file generated at the second time during the full backup operation at the second time becomes the active backup set of the target file. In such case, the version of the full backup set generated at the first time is inactivated.

In yet further embodiments, the delta backup comprises an incremental backup operation that includes all updates to the target file since the previous incremental backup operation. A name is assigned to each incremental backup set that includes a name component indicating the target file and an incremental backup. During each incremental backup operation, a determination is made of a latest time value associated with all incremental backup sets of the target file. The determined latest time value is incremented to generate a new time value. This new time value is included as a name component for the incremental backup set for the target file created during the incremental backup operation.

In client/server embodiments, the operations of initiating each delta backup, the new full backup, assigning the name component, and rendering inactive all the determined delta backup sets is performed at a client computer. The client computer initiates the operations by communicating a command and the target file to backup to a server computer to backup at a storage device. The client computer further determines all the delta backup sets having the name component indicating the target file by querying the server for all delta backup sets having the name component indicating the target file.

With the preferred embodiments, whenever a backup operation is performed, a determination is automatically made of all delta backup sets, i.e., incremental and differential sets, related to the previous full backup. The determined delta backup sets are rendered inactive. This is accomplished by providing each delta backup set a name including a unique name of the target file subject to the backup, a delta backup indicator. Upon performing a new full backup operation, all current delta backups for the target file can be determined from the name components. This naming convention and method allow the delta backups to be automatically removed during the creation of a new full backup set of the target file. Further, with preferred embodiments any full backups have the same name as the previous version, thereby superseding the previous version as the active backup. In this way, whenever a backup is made, any obsolete versions of the backup sets related to the target file are rendered inactive and subject to later removal during expiration operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Computing Environment

Figure 1:
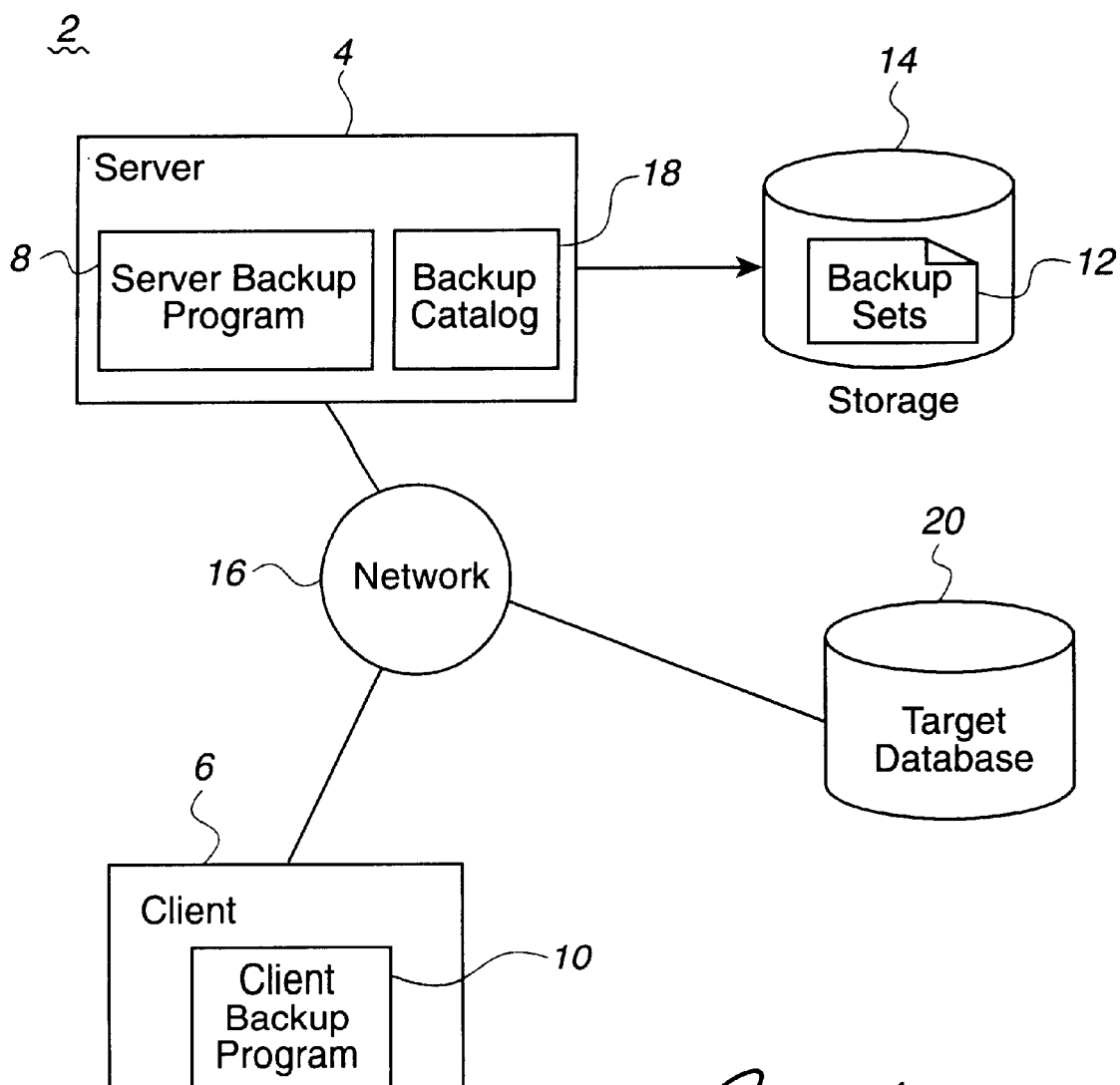
FIG. 1 illustrates a computing environment in which preferred embodiments in accordance with the present invention are implemented.

FIG. 1 illustrates a computing environment in which preferred embodiments are implemented. A computing environment 2 comprises a server 4 and a client computer 6. The server 4 includes a server backup program 8 and the client includes a client backup program 10. The client backup program 10 communicates data sets from the target database 20 to the server backup program 8 to backup in backup sets 12 in storage 14. Preferred embodiments are implemented in the IBM ADSM backup system. Thus, the client 10 and server 8 backup programs may include the functions of the ADSM client and server backup facilities, such as the ADSM system described in the IBM publication "Using ADSM to Back Up Databases," which was incorporated by reference above.

The ADSM system is capable of being implemented in client and server systems including different operating systems such as AIX, Sun Solaris, HP-UX, OS/2, DOS, Microsoft Windows, and the OpenEdition MVS.** The client 6 and server 4 would communicate over a network 16. The network 16 may be a TCP/IP network, such as an Intranet, the Internet, World Wide Web, or any other network system known in the art, e.g., LAN, Ethernet, WAN, Token Ring, etc. Alternatively, there may be separate and different networks between the server 4 client 6. The target database 20 may be implemented in a separate database server connected to the network 16, implemented in the client 6 such that the client controls the database, or anywhere else in the network.

The server backup program 8 maintains a backup catalog 18 that includes information on backup sets 12. Each target database is registered with the backup catalog. During online backups, the backup catalog 18 is automatically updated to reflect the current structure of the target database.

To manage incremental and full backup sets, preferred embodiments provide a naming convention for the backup database sets. A full backup set of a database object is provided the name of the database object, e.g., "DBNAME", with the extension "full," providing a name of "DBNAME.FULL." Because the same name of the full backup of an object is used for all versions, a subsequent full backup of the database object becomes the active version, thereby automatically inactivating the previous version of the full backup. An incremental backup of a database object may have the name format DBOBJECTID.INCR.TIMESTAMP, where DBOBJECTID is a unique database object identifier, "INCR" is an indicator that the file is an incremental backup, and TIME STAMP is a unique time value, such as a time stamp or sequence number, to distinguish subsequent incremental backup sets of the same database object. With this naming convention, there would be only one active full backup set for a database object. However, multiple active incremental backup sets could exist for the active full backup set as the time value of each incremental backup set provides a unique name distinguishing from the other incremental backup sets. Further, incremental backup sets could exist for different versions of the full backup sets. The DBOBJECTID component of the incremental backup sets associates the incremental backup sets with the particular full backup set version identified by the DBOBJECTID.

A differential backup may have the naming convention-DBOBJECTID.DIFF, where DBOBJECTID is a unique identifier of the database object to backup and DIFF indicates that the backup is a differential backup. As there is only one active differential backup for a full backup, a current differential backup becomes the active version of the differential backup made against the database object, thereby automatically inactivating the previous version of the differential backup set.

Figure 2A:
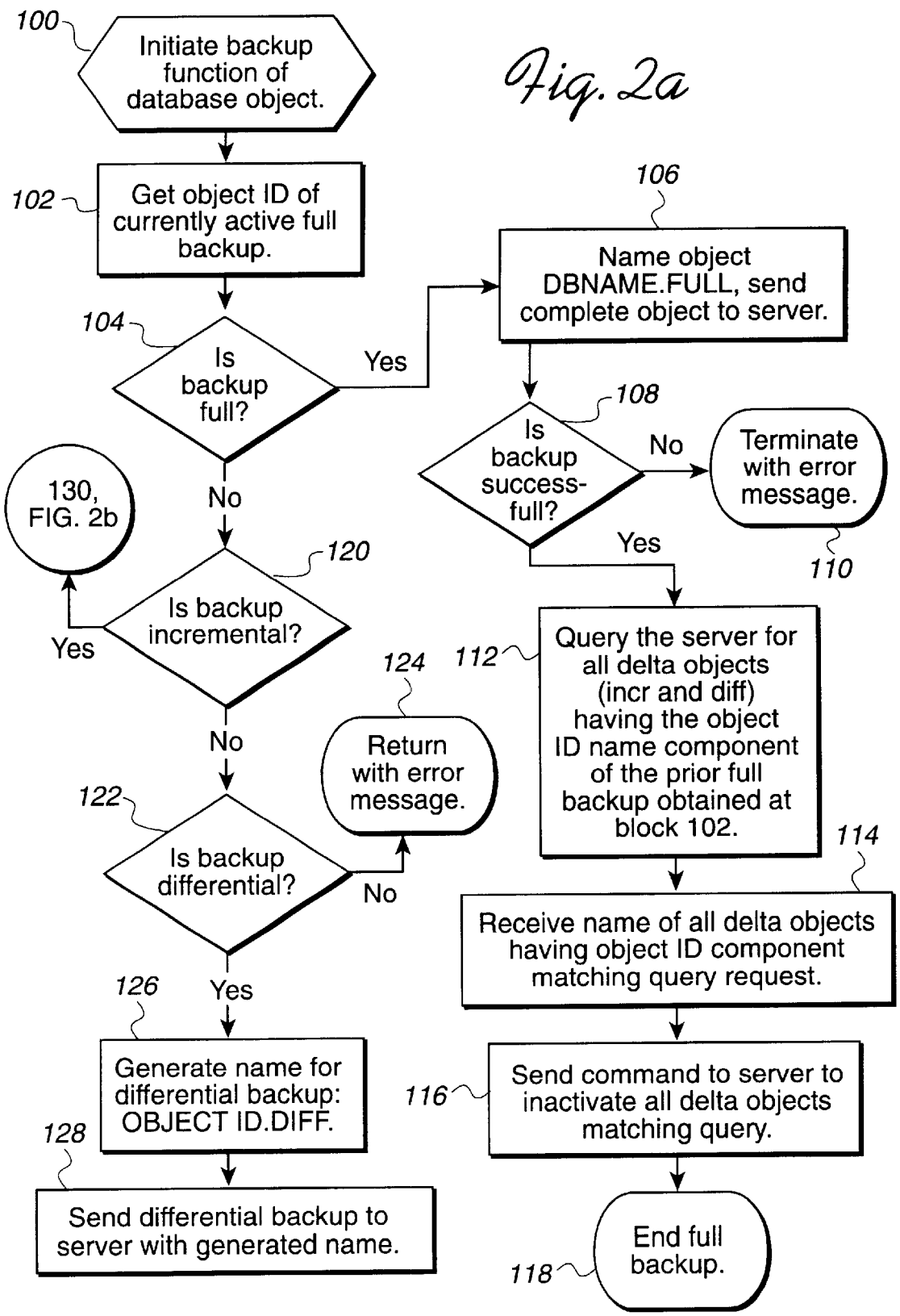
FIGS. 2a and 2b illustrate logic to backup files in accordance with preferred embodiments of the present invention.
Figure 2B:
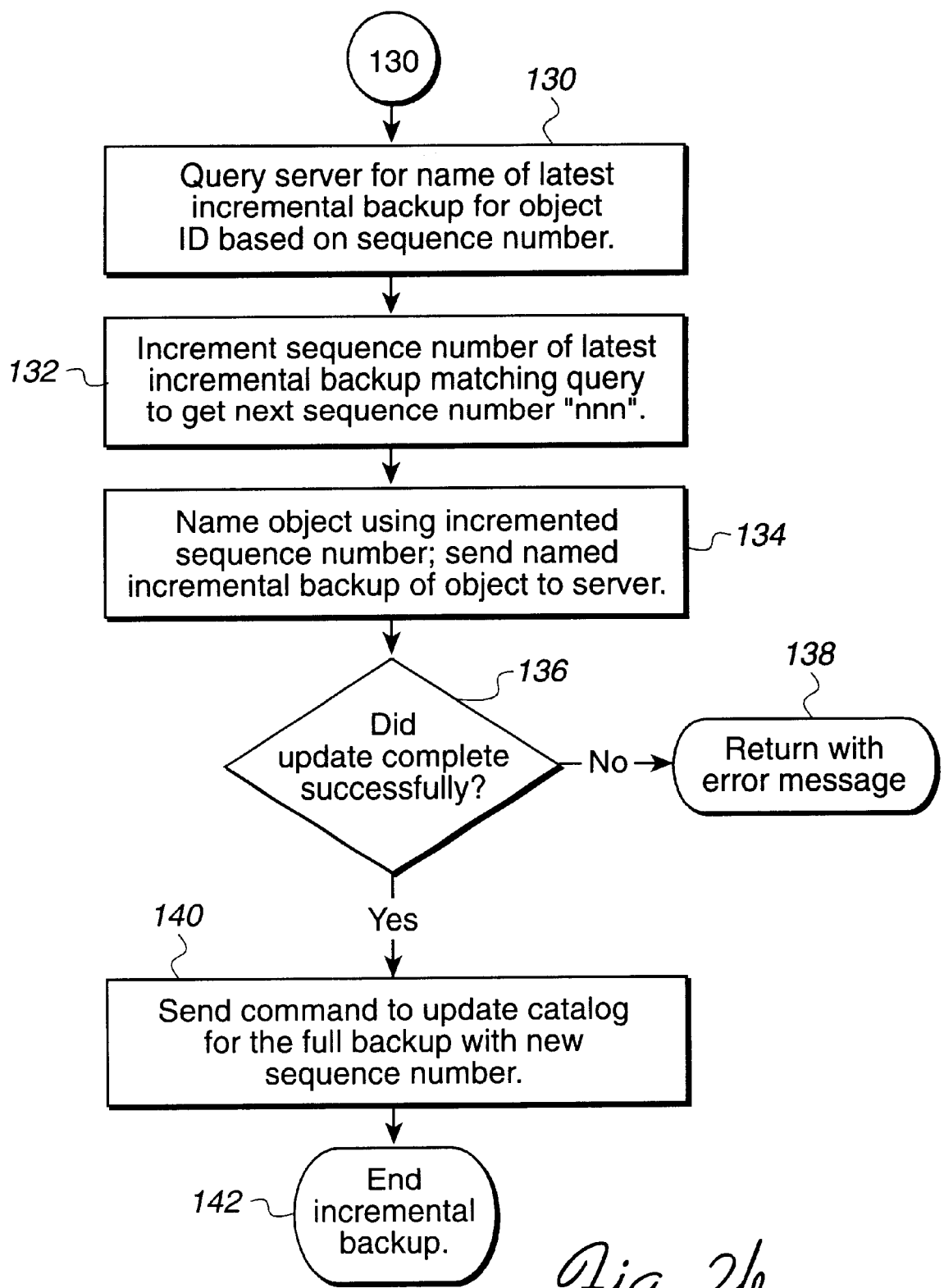

FIGS. 2a, b illustrate logic implemented in the client backup program 10 to use the above described naming convention in a manner that removes obsolete versions of the backup sets of an object when backing up the object. Control begins at block 100 with the client backup program 10 initiating a backup function to backup a database object from the target database 20. The client backup program 10 queries the server to obtain (at block 102) the object ID of the most recent full backup set. The object ID comprises a unique identifier of a specific backup set and version that the server uses to distinguish among multiple versions of a same named backup set, such as different versions of a full backup set. For delta backups, the preferred embodiments utilize the object ID to logically relate the delta backup to a specific version of the full backup, both of which are uniquely identified in the object ID. For full backups, preferred embodiments utilize the object ID to inactivate incremental backups having as a name component the object ID, which indicates incremental backup sets for the previous version of the full backup set. Once inactive, a backup set is a candidate for deletion.

If (at block 104) the backup is a full backup, then the client backup program 10 names (at block 106) the object to backup, referred to as the target object, DBNAME, where DBNAME is the name of the database object. Because this name is the same name as previous full backup versions of the database object, this new full backup set will inactivate the previous version of the full backup. The client backup program 10 sends the complete object having the new name to the server backup program 8 for backup in storage 14. If the backup is not successful (at block 108), then the client backup program 10 terminates (at block 110) the backup function with an error message.

If the backup is successful, then the client backup program 10 queries (at block 112) the server backup program 8 for all delta objects having as a name component the object ID of the previous version of the full backup set, obtained at block 102. In response, the client backup program 10 would receive (at bock 114) a list of all delta objects, incrementals or differentials, including as a name component the identifier for the target object. The client backup program 10 would then send (at block 116) a command to the server to inactivate all delta objects matching the query at block 112. The result is that when doing a full backup, the program automatically inactivates delta objects dependent on the previous full backup at the same time so that they are logically inactivated together. In this way, the naming convention provides the mechanism for providing automatic deletions of files dependent on an obsolete version, such as incremental files. Inactivated objects are eligible for expiration when the server backup program 8 runs a program to remove backup sets that have expired, i.e., satisfy a version or time value limit. The full backup then ends at block 118.

If (at block 104), the backup was not full, i.e., a delta backup, then the client. backup program 10 determines (at block 120) whether the delta backup is incremental. If the delta backup is not incremental, then the client backup program 10 determines (at block 122) whether the delta backup is differential. If not, then the backup is not of a known type and an error message is returned (at block 124). If the delta backup is differential, then the client backup program 10 generates (at block 126) a name of the differential backup comprising DBOBJECTID.DIFF, where DBOBJECTID is a unique identifier of the target database object. The client backup program 10 then sends (at block 128) the differential backup, having the generated name, to the server backup program 8 for backup in the storage 14.

If the delta backup is incremental (at block 120), then the client backup program 10 queries (at block 130) the server backup program 8 for the name of the latest incremental backup for the target database object. The latest incremental backup is determined from a sequence number component of the incremental backup name, e.g., "nnn". The client backup program 10 then increments (at block 132) the sequence number obtained from the server backup program 8 in response to the query, i.e., nnn+1. In alternative embodiments, the server 4 may separately maintain the last used sequence number. In such case, the client backup program 10 does not need the name of the latest incremental backup and instead can just query the server for the last used time value. In still further embodiments a time stamp may be used. In such case, the client backup program 10 does not need to query the server for the time value and instead sets the time value to the current time. The time value component of the name may be determined by still alternative methods known in the art. After obtaining the next time value, the client backup program 10 generates (at block 134) a name for the target object including the new time value in the form DBOBJECTID.INC.NNN. The incremental backup set for the target object having the new generated name is then sent to the server backup program 8 for storage in a backup set 12. If the update did not complete successfully (at block 136), then an error message is returned (at block 138). Otherwise, if the incremental backup was successful, then the client backup program 10 sends (at block 140) a command to the server backup program 8 to update the backup catalog 18 with the new sequence number indicating the new incremental backup added to the system 3. The incremental backup then ends (at block 142).

Preferred embodiments provide a method, system, and program for managing the backup sets maintained in a backup system. With the preferred embodiments, obsolete versions of a backup set are automatically rendered inactive as a result of creating the newer version at the time a newer version of the backup set is added to the backup server. Further, when a full backup is made of a database or other file object, any delta backup sets, such as incremental or differential backup sets, logically related to the previous full backup version of the database or file object are automatically marked as inactive. Thus, with preferred embodiments, obsolete versions are automatically rendered inactive upon becoming obsolete during a full backup without the need for human intervention from an administrator at a client system. Instead, preferred embodiments provide a naming convention and routine for determining when to automatically inactivate obsolete backup sets when the backup is initiated by the client. This is an improvement over current art systems where an administrator must monitor the obsolete versions and then send commands to inactivate such obsolete versions.

Alternative Embodiments and Conclusions

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and/or data files accessible from one or more computer-readable devices, carriers, or media, such as magnetic storage media, "floppy disk," CD-ROM, optical disks, holographic units, volatile or non-volatile electronic memory, a file server providing access to the programs via a network transmission line, wireless transmission media, signals propagating through space, etc. Of course, those skilled in the art will recognize many modifications may be made to this configuration without departing from the scope of the present invention.

Preferred embodiments were described with respect to a network environment in which a client system would initiate a backup operation of a database object to a server system. In further embodiments, the functions performed by the client and server backup programs may be implemented on a single computing system and within such computer system may be implemented within a single backup program.

Preferred embodiments were described with respect to backing up database objects. However, the preferred embodiment backup set management technique may apply to managing the backup of any type of file or data set, including files other than database objects. In such case, the files and data sets backed up would include a unique identifier to include in the generated name component of the backup set.

In summary, the present invention provides a system, method, program, and data structure for performing a backup operation of a target file. At least one operation is initiated to perform at least one delta backup of the target file to at least one delta backup set. A delta backup set includes changes made to a version of a full backup set of the target file generated at a first time. The at least one delta backup set is assigned a name component indicating the version of the full backup set generated at the first time subject to the delta backup and an operation is initiated to perform a full backup of the target file to a version of the full backup set at a second time. The second time follows the first time. A determination is made of all delta backup sets having the name component indicating the version of the full backup set generated at the first time during the full backup operation at the second time. An operation is initiated to render inactive the determined delta backup sets having the name component indicating the version of the full backup generated at the first time.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

WINDOWS is a registered trademark of Microsoft Corporation; AIX, OS/2, OpenEdition, and MVS are registered trademarks of International Business Machines Corporation; Solaris is a trademark of Sun Microsystems, Inc.; HP-UX is a registered trademark of Hewlett-Packard Company.

What is claimed is:

1. A method for performing a backup operation of a target file, comprising:
   initiating at least one operation to perform at least one delta backup of the target file to at least one delta backup set, wherein the at least one delta backup set includes changes made to a version of a full backup set of the target file generated at a first time;
   assigning the at least one delta backup set a name component indicating the version of the full backup set generated at the first time subject to the delta backup;
   initiating an operation to perform a full backup of the target file to a version of the full backup set at a second time, wherein the second time follows the first time, and wherein generating the full backup set of the target file at the second time renders inactive the full backup set generated at the first time; and
   upon rendering inactive the full backup set generated at the first time,
      determining all delta backup sets having the name component indicating the version of the full backup set generated at the first time during the full backup operation at the second time; and
      initiating an operation to render inactive the determined delta backup sets having the name component indicating the version of the full backup generated at the first time, wherein the inactive delta backup sets may be expired, and wherein the delta backup sets are inactivated at a same time as the full backup set generated at the first time is inactivated.

2. The method of claim 1, wherein the name component assigned to the at least one delta backup set indicating the version of the full backup comprises an object ID uniquely identifying the version of the full backup set generated at the first time.

3. The method of claim 1, wherein each version of the full backup set is assigned a same name including a name of the target file, thereby causing the version of the full backup set generated at the second time to become the active version of the full backup set and the full backup set generated at the first time becomes inactive.

4. The method of claim 1, wherein the delta backup comprises an incremental backup operation that includes all updates to the target file since the previous incremental backup operation, further comprising:
   assigning a name to each incremental backup set that includes a name component indicating the version of the full backup set to which the incremental backup set relates and an incremental backup;
   during each incremental backup operation, performing:
      (i) generating a time value; and
      (ii) including new time value as a name component for the incremental backup set created during the incremental backup operation.

5. The method of claim 4, wherein generating the new time value comprises:
   determining a latest sequence number; and
   incrementing the sequence number to generate the new time value.

6. The method of claim 1, wherein the delta backup comprises a differential backup including all cumulative changes to the target file since the last full backup operation, comprising:
   initiating at least one operation to perform a differential backup operation that includes updates to the target file since the fill backup operation at the first time to a new differential backup set; and
   assigning the differential backup set a name including a name component indicating the target file subject to the differential backup, whereby the new differential backup set has a same name as a previous version of the differential backup.

7. The method of claim 1, wherein initiating the operations of each delta backup, the full backup, assigning the name component, and rendering inactive all the determined delta backup sets is performed at a client computer that initiates the operations by communicating a command and the target file to backup to a server computer to backup at a storage device, and wherein determining all the delta backup sets having the name component indicating the target file is performed by the client computer querying the server for all delta backup sets having the name component indicating the target file.

8. The method of claim 7, wherein the delta backup comprises an incremental backup, further comprising:
   the client computer assigning a name to each incremental backup set that includes a name component indicating the version of the full backup set to which the incremental backup set relates and an incremental backup;
   during each incremental backup operation, the client computer further performs:
      (i) generating a time value; and
      (ii) including new time value as a name component for the incremental backup set created during the incremental backup operation.

9. A system for performing a backup operation of a target file, comprising:
  means for initiating at least one operation to perform at least one delta backup of the target file to at least one delta backup set, wherein the at least one delta backup set includes changes made to a version of a full backup set of the target file generated at a first time;
  means for assigning the at least one delta backup set a name component indicating the version of the full backup set generated at the first time subject to the delta backup;
  means for initiating an operation to perform a full backup of the target file to a version of the full backup set at a second time, wherein the second time follows the first time, and wherein generating the full backup set of the target file at the second time renders inactive the full backup set generated at the first time; and
  upon rendering inactive the full backup set generated at the first time,
    means for determining all delta backup sets having the name component indicating the version of the full backup generated at the first time during the full backup operation at the second time; and
    means for initiating an operation to render inactive each determined delta backup set having the name component indicating the version of the full backup set generated at the first time, wherein the inactive delta backup sets may be expired, and wherein the delta backup sets are inactivated at a same time as the full backup set generated at the first time is inactivated.

10. The system of claim 9, wherein each version of the full backup set is assigned a same name including a name of the target file, thereby causing the version of the full backup set generated at the second time to become the active version of the full backup set and the full backup set generated at the first time becomes inactive.

11. The system of claim 9, wherein the delta backup comprises an incremental backup that includes all updates to the target file since the previous incremental backup operation, further comprising:
  means for assigning a name to each incremental backup set that includes a name component indicating the version of the full backup set to which the incremental backup set relates and an incremental backup;
  during each incremental backup operation, means for performing:
    (i) generating a time value; and
    (ii) including new time value as a name component for the incremental backup set created during the incremental backup operation.

12. The system of claim 9, wherein the means for initiating the operations of each incremental backup, the full backup, assigning the name component, and rendering inactive all the determined delta backup sets is performed at a client computer that initiates the operations by communicating a command and the target file to backup to a server computer to backup at a storage device, and wherein determining all the delta backup sets having the name component indicating the target file is performed by the client computer querying the server for all delta backup sets having the name component indicating the target file.

13. An article of manufacture for use in programming a computer for performing a backup operation of a target file, the article of manufacture comprising computer usable storage media including at least one computer program embedded therein that causes the computer to perform:
  initiating at least one operation to perform at least one delta backup of the target file to at least one delta backup set, wherein the at least one delta backup set includes changes made to a version of a full backup set of the target file generated at a first time;
  assigning the at least one delta backup set a name component indicating the version of the full backup set generated at the first time subject to the delta backup;
  initiating an operation to perform a full backup of the target file to a version of the full backup set at a second time, wherein the second time follows the first time, and wherein generating the full backup set of the target file at the second time renders inactive the full backup set generated at the first time; and
  upon rendering inactive the full backup set generated at the first time,
    determining all delta backup sets having the name component indicating the version of the full backup set generated at the first time during the full backup operation at the second time; and
    initiating an operation to render inactive the at least one determined delta backup set having the name component indicating the version of the full backup set generated at the first time, wherein the inactive delta backup sets may be expired, and wherein the delta backup sets are inactivated at a same time as the full backup set generated at the first time is inactivated.

14. The article of manufacture of claim 13, wherein the name component assigned to the at least one delta backup set indicating the version of the full backup comprises an object ID uniquely identifying the version of the full backup set generated at the first time.

15. The article of manufacture of claim 13, wherein each version of the full backup set is assigned a same name including a name of the target file, thereby causing the version of the full backup set generated at the second time to become the active version of the full backup set and the full backup set generated at the first time. becomes inactive.

16. The article of manufacture of claim 13, wherein the delta backup comprises an incremental backup operation that includes all updates to the target file since the previous incremental backup operation, further comprising:
  assigning a name to each incremental backup set that includes. a name component indicating the version of the full backup set to which the incremental backup set relates and an incremental backup;
  during each incremental backup operation, performing:
    (i) generating a time value; and
    (ii) including new time value as a name component for the incremental backup set created during the incremental backup operation.

17. The article of manufacture of claim 16, wherein generating the new time value comprises:
  determining a latest sequence number; and
  incrementing the sequence number to generate the new time value.

18. The article of manufacture of claim 13, wherein the delta backup comprises a differential backup operation including all cumulative changes to the target file since the last full backup operation, further comprising:
  initiating at least one operation to perform a differential backup operation that includes updates to the target file since the full backup operation at the first time to a new differential backup set; and
  assigning the differential backup set a name including a name component indicating the target file subject to the differential backup, whereby the new differential backup set has a same name as a previous version of the differential backup.

19. The article of manufacture of claim 13, wherein the operations of each delta backup, the full backup, assigning the name component, and rendering inactive all the determined delta backup sets are initiated through commands executed at a client computer and communicated to a server computer, and wherein determining all the delta backup sets having the name component indicating the target file is performed by the client computer querying the server for all delta backup sets having the name component indicating the target file.

20. The article of manufacture of claim 19, wherein the delta backup comprises an incremental backup operation that includes all updates to the target file since the previous incremental backup operation, further comprising:

the client computer assigning a name to each incremental backup set that includes a name component indicating the version of the full backup set to which the incremental backup set relates and an incremental backup;

during each incremental backup operation, the client computer further performs:
(i) generating a time value; and
(ii) including new time value as a name component for the incremental backup set created during the incremental backup operation.

21. A plurality of data structures implemented in a computer useable storage medium accessible to a computer, wherein the data structures comprise:

at least one delta backup set including changes made to a version of a full backup set of the target file generated at a first time, wherein the at least one delta backup set has a name component indicating the version of the full backup set generated at the first time subject to the delta backup; and a version of the full backup set generated during a backup operation at a second time, wherein the second time follows the first time, wherein adding the full backup set at the second time initiates an operation to render inactive each determined delta backup set having the name component indicating the version of the full backup generated at the first time, wherein generating the full backup set of the target file at the second time renders inactive the full backup set generated at the first time, and wherein the inactive delta backup sets may be expired, and wherein the delta backup sets are inactivated at a same time as the full backup set generated at the first time is inactivated.

22. The data structures of claim 21, wherein the name component assigned to the at least one delta backup set indicating the version of the full backup set comprises an object ID uniquely identifying the version of the full backup set generated at the first time.

23. The data structures of claim 21, wherein each version of the full backup set is assigned a same name including a name of the target file, thereby causing the version of the full backup set at the second time to become the active version of the full backup set and the full backup set generated at the first time becomes inactive.

24. The data structures of claim 21, wherein the delta backup comprises an incremental backup operation that includes all updates to the target file since the previous incremental backup operation, wherein each incremental backup set includes a name component indicating the version of the full backup set to which the incremental backup set relates, an incremental backup type, a new time value created during the incremental backup operation.

25. The data structures of claim 21, wherein the delta backup comprises a differential backup including all cumulative changes to the target file since the last full backup operation, wherein each differential backup set includes a name component indicating the version of the full backup set to which the differential backup set relates and a differential backup type.

* * * * *

UNITED STATES PATENT AND TRADEMARK OFFICE
CERTIFICATE OF CORRECTION

PATENT NO. : 6,647,399 B2
DATED : November 11, 2003
INVENTOR(S) : Christopher Zaremba It is certified that error appears in the above-identified patent and that said Letters Patent is hereby corrected as shown below:

Column 8,
Line 65, after "including", insert -- a --.

Column 9,
Line 48, after "including", insert -- a --.

Column 11,
Line 22, after "including", insert -- a --.

Signed and Sealed this

Seventeenth Day of January, 2006

JON W. DUDAS
*Director of the United States Patent and Trademark Office*